United States Patent  (10) Patent No.: US 10,302,765 B2
Katsura et al. (45) Date of Patent: May 28, 2019

(54) SYSTEM AND APPARATUS FOR MONITORING AREAS

(71) Applicants: DENSO WAVE INCORPORATED, Chita-gun, Aichi-pref. (JP); DENSO CORPORATION, Kariya, Aichi-pref. (JP)

(72) Inventors: Shoji Katsura, Tokai (JP); Tetsuya Iwasaki, Kariya (JP); Keiji Matsumoto, Kariya (JP)

(73) Assignees: DENSO WAVE INCORPORATED, Aichi-pref. (JP); DENSO CORPORATION, Kariya (JP)

( * ) Notice: Subject to any disclaimer, the term of this patent is extended or adjusted under 35 U.S.C. 154(b) by 381 days.

(21) Appl. No.: 15/183,229

(22) Filed: Jun. 15, 2016

(65) Prior Publication Data

US 2016/0370464 A1 Dec. 22, 2016

(30) Foreign Application Priority Data

Jun. 17, 2015 (JP) ................................. 2015-121995

(51) Int. Cl.
*G01C 3/08* (2006.01)
*G01S 17/02* (2006.01)
*G01S 17/42* (2006.01)
*G01S 7/481* (2006.01)
*G01V 8/18* (2006.01)

(52) U.S. Cl.
CPC .......... *G01S 17/026* (2013.01); *G01S 7/4817* (2013.01); *G01S 17/42* (2013.01); *G01V 8/18* (2013.01)

(58) Field of Classification Search
CPC ...... G01S 17/026; G01S 17/42; G01S 7/4817; G01V 8/18
USPC ......................................................... 356/5.01
See application file for complete search history.

(56) References Cited

U.S. PATENT DOCUMENTS

| 4,893,005 A * | 1/1990 | Stiebel ..................... G01V 8/18 250/221 |
| 6,535,159 B1 | 3/2003 | Nishiguchi et al. |
| 2003/0168581 A1 | 9/2003 | Hipp |
| 2012/0176593 A1* | 7/2012 | Frucht ................... G01S 7/4865 356/4.01 |

(Continued)

FOREIGN PATENT DOCUMENTS

JP 2000-046961 A 2/2000
JP 2014-181993 A 9/2014

*Primary Examiner* — Mark Hellner
(74) *Attorney, Agent, or Firm* — Oliff PLC

(57) ABSTRACT

An area monitoring system is configured to include a monitoring apparatus and a reflector. The monitoring apparatus includes a time-based detecting unit (i.e., a first detecting unit) that detects an intruder at a scanning angle by measuring a distance to an object based on an elapsed time until reflected light is received, for a first detection area. The monitoring apparatus further includes a light reception amount-based detecting unit (i.e., a second detecting unit) that detects an intruder at a scanning angle by comparing an actual light reception amount at a timing at which reflected light is received when radiated laser light is reflected by a reflector, and a light reception threshold (i.e., a reference light reception amount) set in advance, with a second detection area set farther than the first detection area as an area subjected to detection.

7 Claims, 10 Drawing Sheets

(56) References Cited

U.S. PATENT DOCUMENTS

2013/0187032 A1* 7/2013 Kawabata ............. G01S 7/4812
250/214 SW
2014/0168633 A1* 6/2014 Guetta ................. G08B 13/189
356/5.01

* cited by examiner

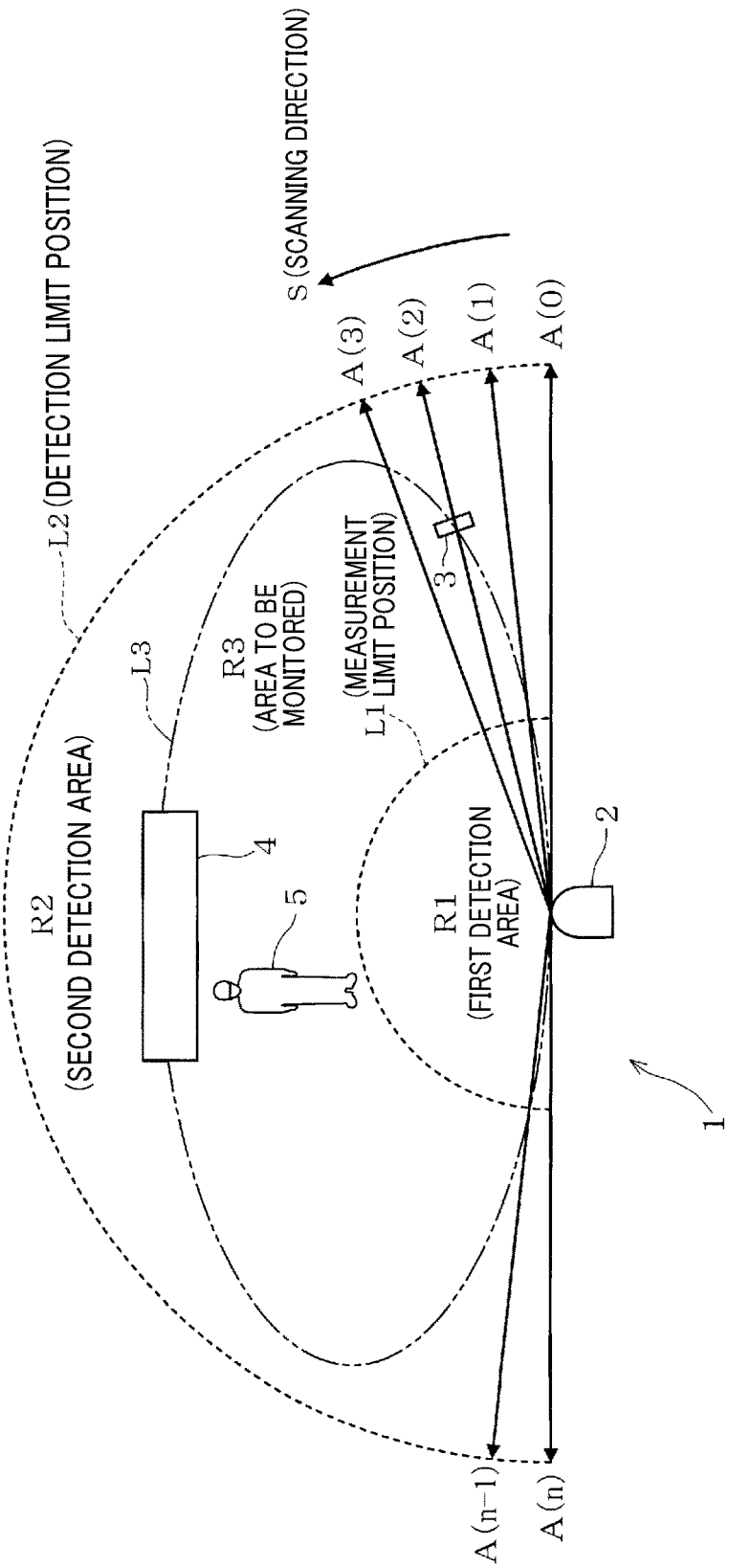

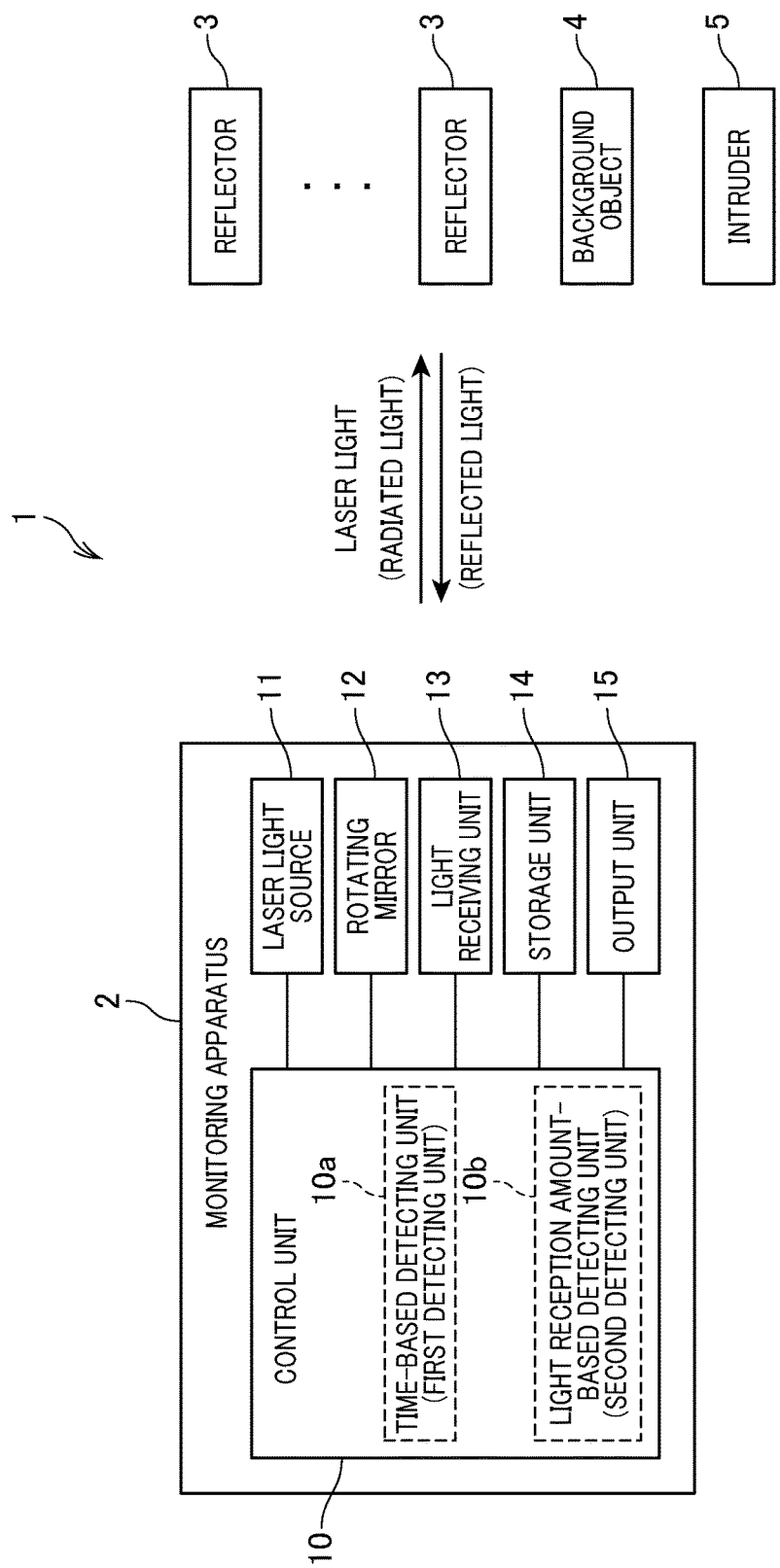

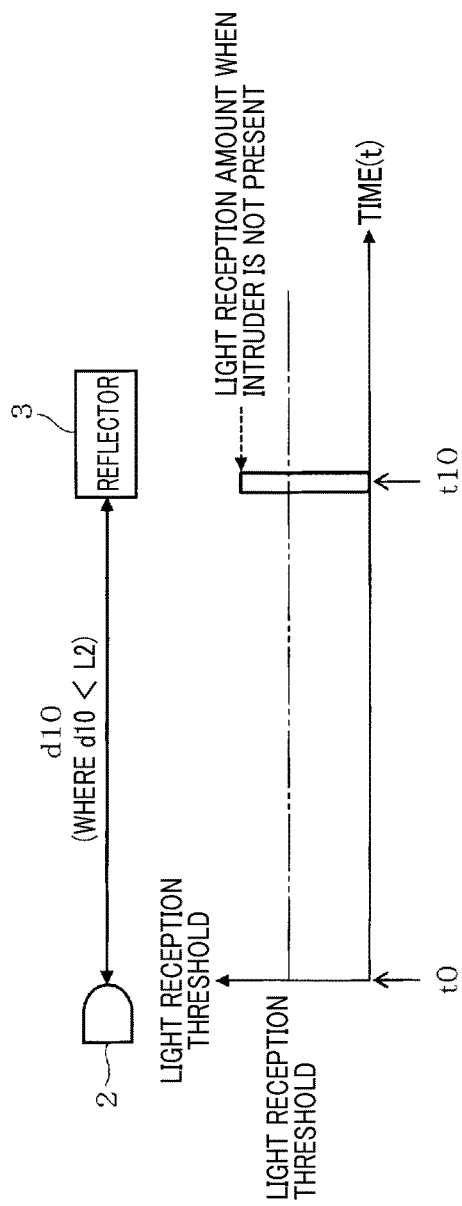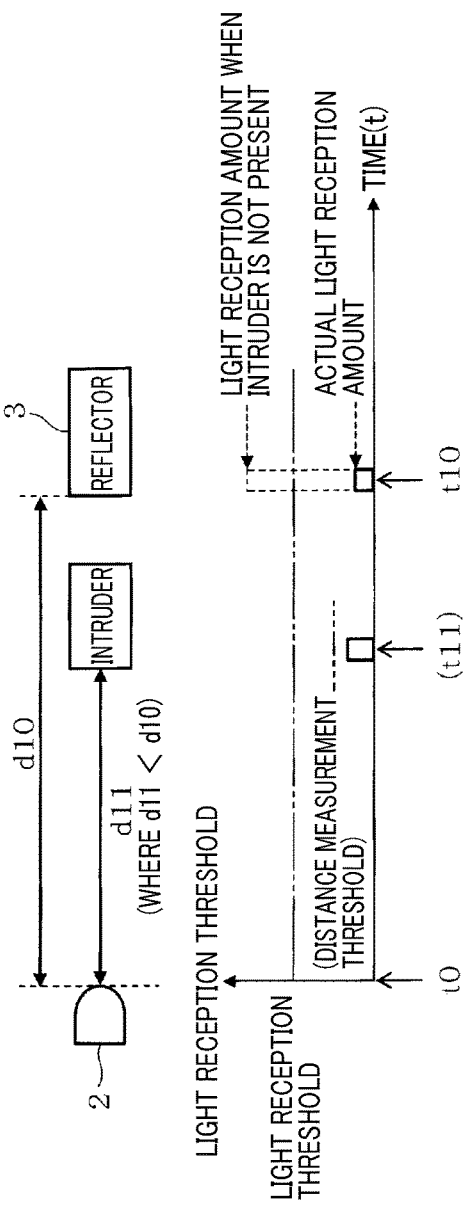
FIG.4A
FIG.4B

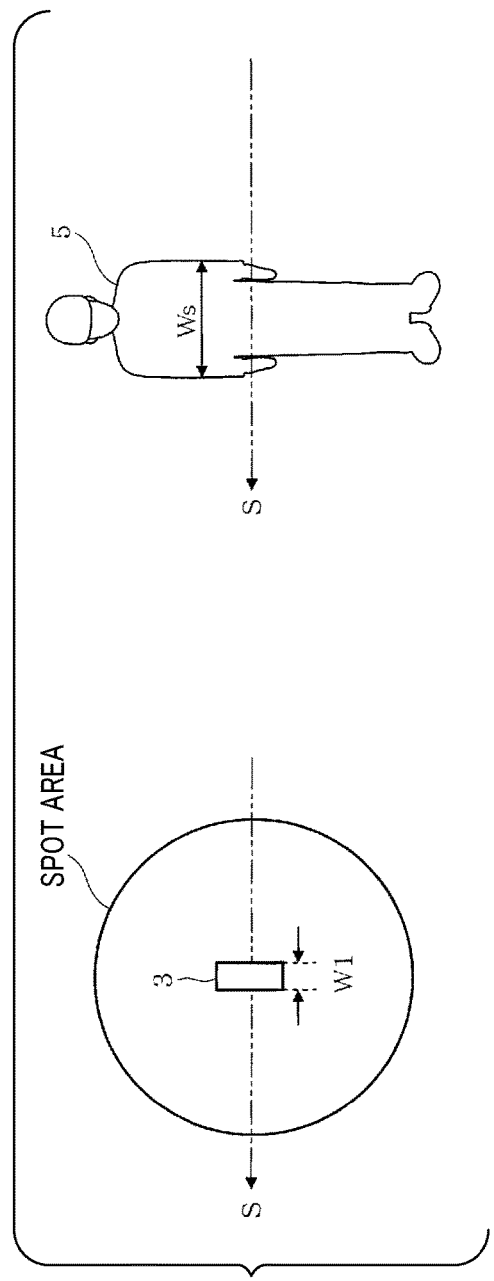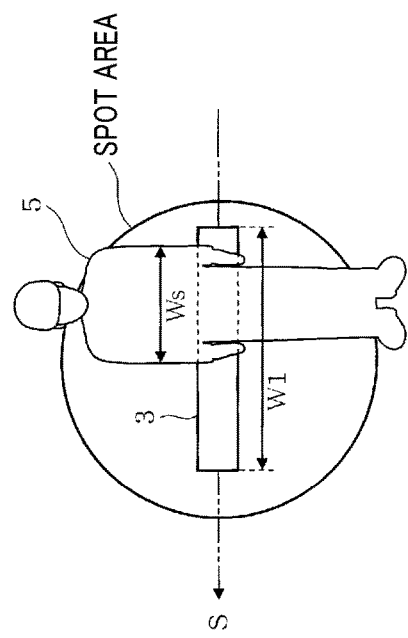
FIG.5A
FIG.5B

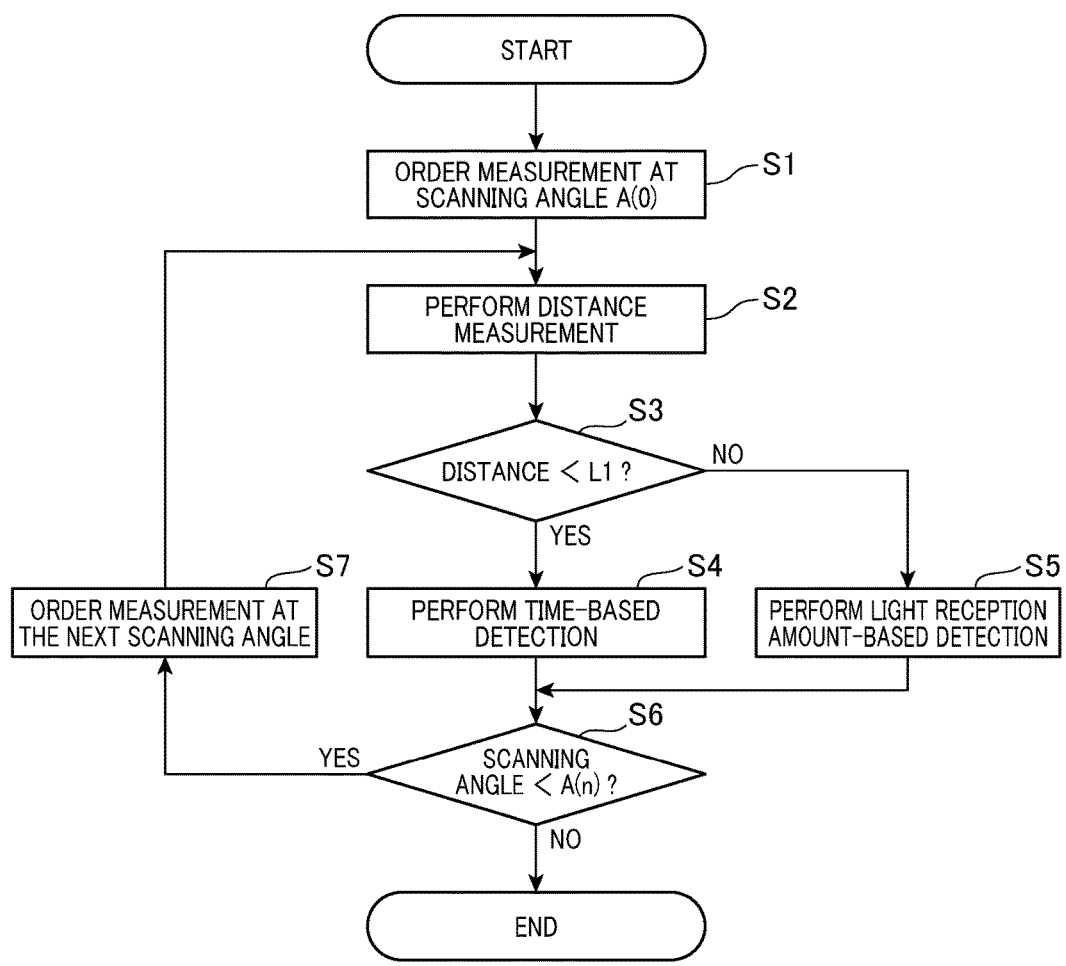

SYSTEM AND APPARATUS FOR MONITORING AREAS

CROSS-REFERENCE TO RELATED APPLICATION

This application is based on and claims the benefit of priority from earlier Japanese Patent Application No. 2015-121995 filed Jun. 17, 2015, the description of which is incorporated herein by reference.

BACKGROUND

Technical Field

The present invention relates to a system and an apparatus for monitoring areas, and in particular, to a system and an apparatus for monitoring areas which are previously set to be monitored using laser light.

Background Art

An area monitoring system that detects an intruder within an area to be monitored by scanning the area to be monitored with laser light at each predetermined scanning angle, and a monitoring apparatus used in such an area monitoring system are known (for example, refer to JP-A-2014-181993).

Such area monitoring systems and monitoring apparatuses are typically provided with a rotating mirror that is rotated by a motor. Laser light is radiated towards the area to be monitored at each predetermined scanning angle, by the rotating mirror. A distance to an object is measured based on the amount of time from when the laser light is radiated, until the radiated laser light is reflected by the object and the reflected light is received. Detection of an intruder is thereby performed at each scanning angle.

Here, in the case in which an intruder is detected through use of reflected light, should the area to be monitored be within a range of 30 meters in the current state, for example, the laser light is required to be radiated at an output power which enables the laser light to reach at least twice the range, that is, 60 meters. However, the reflected light is required to be received with a certain degree of intensity (referred to, hereafter, as a light reception amount) to ensure measurement accuracy. In addition, the laser light scatters when reflected by an object. When such issues are taken into consideration, the actual required output of the laser light is required to be set, not to enable a reach of about twice the range, but even greater. It is known that the energy of laser light attenuates in inverse proportion to the square of the distance. Therefore, here, the required output of the laser light increases in an accelerating manner as the area to be monitored widens.

However, even should there be a desire to widen the area to be monitored, in reality, the fact is that the output of the laser light cannot be easily increased, from the perspective of safety. For example, when the area to be monitored is set to a range of 100 meters, the required output of the laser light is approximately 11 times the output required for the range of 30 meters, described above. Therefore, the output of the laser light may exceed a range that is considered safe should the laser light directly enter the human eye, such as the range of Class 1 laser output prescribed by JIS C 6802.

In addition, in the case in which the reflected light is used, the laser light also reaches outside of the area to be monitored due to the configuration. Therefore, when the output of the laser light is increased, persons outside of the area to be monitored may be affected in addition to persons inside the area to the monitored.

Meanwhile, the need for monitoring over an even greater distance is rising. An area monitoring system and a monitoring apparatus that are capable of monitoring over an even greater distance, while ensuring safety, are desired.

It is thus desired to provide an area monitoring system and a monitoring apparatus that are capable of monitoring over an even greater distance, while ensuring safety.

SUMMARY

In an exemplary embodiment, an area monitoring system is configured to include a monitoring apparatus and a reflector. The monitoring apparatus detects an intruder (i.e., intruding object) by radiating laser light at each predetermined scanning angle and scanning an area to be monitored. The reflector is provided within the area to be monitored and reflects the laser light radiated from the monitor apparatus towards the monitor apparatus.

The monitor apparatus includes a first detecting unit and a second detecting unit. The first detecting unit detects the intruder at a scanning angle by measuring a distance to an object based on an elapsed time from when the laser light is radiated until the reflected light is received, for a first detection area set near the monitoring apparatus. The second detecting unit detects the intruder at a scanning angle by comparing an actual light reception amount at a timing at which reflected light is received when the laser light is reflected by the reflector, and a reference light reception amount set in advance to determine whether or not an object is present between the monitoring apparatus and the reflector, with a second detection area that is set farther than the first detection area and provided with the reflector as an area subjected to detection.

As a result of a configuration such as this being provided, regarding the first detection area, the first detecting unit can detect an intruder by a method similar to that in the past, that is, by measuring the distance to an object based on the amount of time until the reflected light is received, and determining whether or not the object is an intruder based on the distance. At this time, a position of the boundary of the first detection area, that is, a measurement limit position up to which the first detecting unit is capable of performing distance measurement is determined based on the output of the laser light.

In addition, the reflector, that is, a member having high reflectance and capable of reflecting most of the light that enters is provided in the second detection area that is set farther than the first detection area. The reflector reflects the laser light towards the monitoring apparatus. Therefore, when an object is not present between the monitoring apparatus and the reflector, the light reception amount when the reflected light is received is high. Meanwhile, when an object is present between the monitoring apparatus and the reflector, the light reception amount attenuates.

Therefore, regarding the second detection area, as a result of the second detecting unit comparing the actual light reception amount and the reference light reception amount, that is, determining whether the actual light reception amount is higher or lower than a reference value set in relation to a light reception amount when an object is not present between the monitoring apparatus and the reflector, a determination can be made that an object is not present between the monitoring apparatus and the reflector when the actual light reception amount is higher than the reference light reception amount. A determination can be made that an object is present between the monitoring apparatus and the reflector when the actual light reception amount is lower than the reference light reception amount. In other words, regarding the second detection area in which distance measurement by the first detecting unit is not possible because the second detection area is set far from the monitoring apparatus, whether or not an intruder is present can be detected based on the light reception amount.

As a result, detection of an intruder can be performed in the first detection area and the second detection area that is set farther than the first detection area. At this time, in the second detection area, the reflector reflects most of the laser light towards the monitoring apparatus. Therefore, even when the distance from the monitoring apparatus to the reflector is greater than that to the measurement limit position of the first detection area, the reflected light can be received at a sufficient light reception amount.

Consequently, in a configuration in which the first detection area is monitored using laser light of which the output is determined to be safe even when the laser light is directly viewed, monitoring of the second detection area set farther than the first detection area becomes possible without requiring an increase in the output of the laser light. That is, monitoring over an even greater distance becomes possible, while ensuring safety.

In another embodiment, the reflector is provided within a spot area that indicates an area over which the laser light is irradiated at each scanning angle. A width of the reflector in a scanning direction of the laser light is set to be shorter than a width of the intruder presumed to be a detection target in the scanning direction. As a result, when the intruder is present in a spot area, the light reception amount is attenuated as a result of the overall reflector being blocked by the intruder. Whether or not the intruder is present can be clearly detected.

In another embodiment, a plurality of reflectors are provided within a spot area indicating an area over which the laser light is irradiated at each scanning angle. The reflectors are provided so as to be separated from each other in the scanning direction of the laser light. As a result, the period required for an intruder to cross all of the reflectors becomes longer than that required when a single reflector is provided. In other words, the period over which the intruder is blocking any of the reflectors becomes longer. Therefore, a sufficient detection period is ensured. Even when scanning is performed at each scanning angle at a fixed interval, the likelihood of an intruder being detected can be increased. In addition, as a result of the plurality of reflectors being provided, it becomes difficult for the intruder to move so as not to block each of the reflectors. Therefore, the likelihood of an intruder being detected can be further increased.

In another exemplary embodiment, of the plurality of reflectors, at least a pair of reflectors provided adjacent to each other are set such that a width between both ends in the scanning direction including a reflection area thereof is shorter than the width of the intruder in the scanning direction. As a result, when the intruder is present, at least the pair of reflectors is blocked by the intruder in their entirety, including the reflection surfaces thereof. As a result, when the intruder is present, a significant attenuation in the light reception amount can be obtained compared to when the intruder is not present. Whether or not an intruder is present can be more clearly detected.

In another exemplary embodiment, a radiating unit, a light receiving unit, a first detecting unit, and a second detecting unit are provided. The radiating unit radiates laser light. The light receiving unit receives reflected light when the laser light radiated by the radiating unit is reflected by an object. The first detecting unit subjects the above-described first detection area to detection. The second detecting unit subjects the above-described second detecting area to detection. Therefore, in a manner similar to the foregoing, an effect can be achieved in that monitoring over an even greater distance becomes possible, while ensuring safety.

BRIEF DESCRIPTION OF THE DRAWINGS

In the accompanying drawings:

FIG. 1 is a diagram schematically showing an overview of an area monitoring system according to a first embodiment, together with an example of an area to be monitored, a reflector position, and an object present inside the area to be monitored;

FIG. 2 is a diagram schematically showing a configuration of a monitoring apparatus;

FIG. 4A and FIG. 4B are diagrams schematically showing a method for detecting an intruder based on a light reception amount;

FIG. 5A and FIG. 5B are diagrams schematically showing a configuration of a reflector;

FIG. 6 is an outlined flowchart showing a monitoring process performed by a control unit provided in the monitoring system;

DETAILED DESCRIPTION OF THE PREFERRED EMBODIMENTS

Figure 3A:
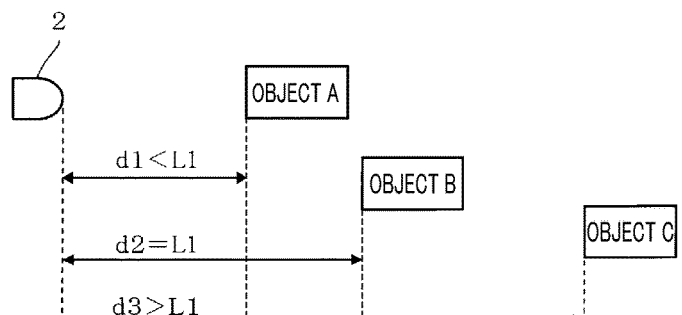
FIG. 3A and FIG. 3B are diagrams schematically showing a method for detecting an intruder based on distance measurement.

A plurality of embodiments of the present invention will hereinafter be described with reference to the drawings. Sections that are substantially the same among the embodiments are given the same reference number. Detailed descriptions thereof are omitted.

First Embodiment

A first embodiment will be described below with reference to FIG. 1 to FIG. 5.

As shown in FIG. 1, an area monitoring system 1 according to the present embodiment includes a monitoring apparatus 2 and a reflector 3 (corresponding to a reflector). The monitoring apparatus 1 radiates laser light. The reflector 3 reflects the radiated laser light towards the monitoring apparatus 2. Although described in detail hereafter, in the area monitoring system 1, a first detection area R1 is set near the monitoring apparatus 2 and a second detection area R2 is set farther than the first detection area R1 when viewed from the monitoring apparatus 2.

In this case, for example, an area to be monitored R3 is set over a range including the first detection area R1 and the second detection area R2, either in their entirety or in part, or a range straddling the first detection area R1 and the second detection area R2. The area to be monitored R3 is an area actually set by the user as an area to be monitored. A background object 4, which is a stationary object such as a building, is also present in the area to be monitored R3. However, information on the background object 4 (distance and scanning angle, described hereafter; referred to, hereafter, as background information for convenience) is registered in advance, and therefore, the background object 4 can be differentiated from an intruder (i.e., intruding object) 5 that is an object to be detected.

As shown in FIG. 2, the monitoring apparatus 2 includes a control unit 10, a laser light source 11 (corresponding to a radiating unit), a rotating mirror 12 (configuring the radiating unit and a light receiving unit), a light receiving unit 13, a storage unit 14, an output unit 15, and the like. The control unit 10 is configured by a microcomputer that has a central processing unit (CPU), a read-only memory (ROM), a random access memory (RAM), and the like (not shown). The control unit 10 controls the overall monitoring apparatus 2 by running computer programs stored in the storage unit 14 and the like. In addition, according to the present embodiment, the control unit 10 actualizes, through software shown in FIG. 6, a time-based detecting unit 10a (corresponding to a first detecting unit) and a light reception amount-based detecting unit 10b (corresponding to a second detecting unit) by running computer programs.

The monitoring apparatus 2 radiates the laser light radiated from the laser light source 11 towards the area to be monitored R3 at each predetermined scanning angle (for example, A(0) to A(n) shown in FIG. 1), by rotating the rotating mirror 12. The monitoring apparatus 2 then receives reflected light generated when the laser light is reflected by an object in the area to be monitored R3 to detect an intruder (i.e., intruding object) 5 at each predetermined scanning angle. When the intruder 5 is detected, the monitoring apparatus 2 outputs a notification that the intruder 5 has been detected, to the user, another apparatus, or the like, through sound, signals, or the like.

In the area monitoring system 1 according to the present embodiment, detection of the intruder 5 is performed by differing methods for the first detection area R1 and the second detection area R2.

In the case of the area monitoring system 1, detection of the intruder 5 in the first detection area R1 is performed by the time-based detecting unit 10a. Detection of the intruder 5 by the time-based detecting unit 10a is substantially identical to a method used since the past. That is, the intruder 5 is detected through measurement of the distance to an object based on the amount of time from when the laser light is radiated until the reflected light is received. In this case, a measurement limit position L1 (see FIG. 1) of the first detection area R1 is set in a position that is at the limit of distance measurement using reflected light.

Figure 3B:
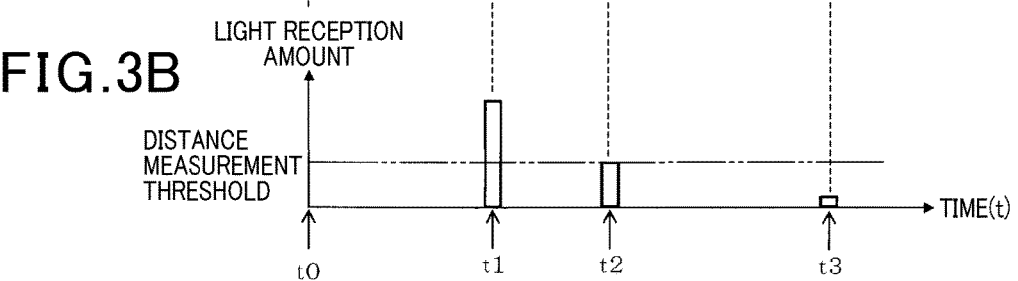

For example, as shown in FIG. 3A, an object A is present in a position at distance d1 from the monitoring apparatus 2 (where d1<L1). An object B is present in a position at distance d2 from the monitoring apparatus 2 (where d2=L1). An object C is present in a position at distance d3 from the monitoring apparatus 2 (where d3>L1). At this time, when the laser light is radiated at time t0 as shown in FIG. 3B, the reflected light reflected by the object A is received by the light receiving unit 13 when an amount of time corresponding to distance d1, or more specifically, when an amount of time required for the laser light to travel a distance of 2×d1 has elapsed (time t1).

At this time, when the light reception amount of the reflected light received at time t1 exceeds a distance measurement threshold set in advance, that is, when the light reception amount is that guaranteeing that the received reflected light has been reflected by an object within the first detection area R1, the distance to the object can be obtained based on the amount of time from time t0 to t1. Then, whether or not the object is an intruder 5 can be determined by the distance to the detected object and the scanning angle being compared with the above-described background information.

In a similar manner, when the light reception amount of the reflected light received at time t2 exceeds the distance measurement threshold, the monitoring apparatus 2 obtains the distance to the object (object B in FIG. 3) based on the amount of time from time t0 to t2. The monitoring apparatus 2 can then determine whether or not the object is the intruder 5 by comparing the distance to the detected object and the scanning angle with the background information.

However, when an object is present at distance d3 of which the position is farther than the measurement limit position L1, such as in the case of the object C, even should the reflected light reflected by the object C be received, the light reception amount is lower than the distance measurement threshold, as at time t3. The received light can no longer be considered significant (as basis for calculating distance). Therefore, an object farther than the measurement limit position L1 cannot be detected by the time-based detecting unit 10a.

Should the first detection area R1 be widened beyond the measurement limit position L1 of the first detection area R1 prescribed based on the light reception amount (that is, the output of the laser light) when the reflected light is received, as described above, or in other words, when the measurement limit position L1 is to be increased, the output of the laser light is required to be increased. Ensuring safety becomes difficult. In addition, should a change in the current design become necessary as a result of the output of the laser light being increased, development cost will also increase.

Therefore, according to the present embodiment, detection of the intruder 5 in the second detection area R2, which is not possible by the time-based detecting unit 10a, becomes possible without increase in the output of the laser light, as a result of the light reception amount-based detecting unit 10b being provided. A method performed by the light reception amount-based detecting unit 10b will be described in detail below.

As shown in FIG. 1 and the like, detection of the intruder 5 by the light reception amount-based detecting unit 10b is actualized by, for example, a reflector 3 being provided on a boundary L3 of the area to be monitored R3 within the second detection area R2. The reflector 3 reflects the laser light radiated from the monitoring apparatus 2 towards the monitoring apparatus 2. The reflector 3 provides a so-called retroreflective function of reflecting incident light back towards the direction of incidence.

Therefore, the reflector 3 can be arranged with relative ease, because the reflector 3 is not necessarily required to have a directly-facing positional relationship with the monitoring apparatus 2, nor is wiring required between the reflector 3 and the monitoring apparatus 2. As the reflector 3, for example, a plate-shaped base member provided with a retroreflective coating or tape, or a base member in which a corner cube is formed on the surface itself may be used as appropriate based on the environment in which the area monitoring system 1 is to be used, that is, whether the area monitoring system 1 is used indoors or outdoors.

For example, as shown in FIG. 4A, the reflector 3 is arranged in a position at distance d10 from the monitoring apparatus 2. In this case, the laser light radiated at time t0 is received at time t10 that is based on the distance d10 to the reflector 3. The scanning angle at which the reflector 3 is arranged and the distance to the reflector 3 are registered to the storage unit 14 or the like at the time of a placement operation (calibration operation). Therefore, the timing at which the reflected light reflected by the reflector 3 is received (time t10 in FIG. 4A) can be considered known.

As shown in FIG. 5A, the reflector 3 is provided within a spot area of the laser light (an area over which the laser light is irradiated at one scanning angle). FIG. 5A shows an example of a front view of the spot area over which the laser light is irradiated, viewed from the monitoring apparatus 2 side. According to the present embodiment, the measurement limit position L1 of the first detection area R1 is set in a position that is 30 meters away from the monitoring apparatus 2, based on the output of the laser light. When laser light having such an output is used, for example, the spot area at a position 100 meters away from the monitoring apparatus 2 is a circle having a diameter of substantially 1.2 meters. An outer edge of the second detection area R2, that is, a detection limit position L2 of detection by the monitoring apparatus 2 (see FIG. 1) can be set in an even farther position of the laser light.

In addition, a width W1 of the reflector 3 in the scanning direction indicated by arrow S in FIG. 5A is set to be shorter than, for example, a width Ws of a person that is the intruder 5 to be detected. Therefore, when the intruder 5 is positioned in front of the reflector 3, the space between the reflector 3 and the monitoring apparatus 2 is blocked by the intruder 5. In this case, the radiated laser light is reflected by the surface of the intruder 5. The reflected light that is retroreflected by the reflector 3 is not received. According to the present embodiment, the width W1 is set to about several centimeters (such as four centimeters). In FIG. 5A, the width Ws is set to a lateral width (substantially the shoulder width) of a person. However, the width Ws may be set to the thickness (substantially the thickness of the chest) of a person.

As a result of the reflector 3 such as this being arranged, when an object is not present between the monitoring apparatus 2 and the reflector 3, over 90% of the radiated laser light is received as the reflected light because the laser light is retroreflected by the reflector 3. Even should the reflector 3 be provided in the second detection area R2, the monitoring apparatus 2 is capable of receiving the reflected light from the reflector 3 at a light reception amount that is sufficiently significant.

Should the width W1 of the reflector 3 be longer than the width Ws of the intruder 5, as shown in FIG. 5B, although depending on the width W1 of the reflector 3, a portion of the reflector 3 is blocked by the intruder 5, and the remaining portion is not blocked. Consequently, light that is reflected by the unblocked portion is received. Whether or not the reflector 3 is blocked may become indeterminable. Therefore, according to the present embodiment, the width W1 of the reflector 3 is set to be shorter than the width Ws of the intruder 5.

A light reception threshold (corresponding to a reference light reception amount) is set in the monitoring apparatus 2. The light reception threshold serves as reference for determining whether or not an object is present between the monitoring apparatus 2 and the reflector 3. When the light reception amount exceeds the light reception threshold, the light reception amount is considered sufficiently significant. A determination is made that the reflected light from the reflector 3 is received. In other words, when the light reception amount is sufficiently significant, a determination is made that an object is not present between the monitoring apparatus 2 and the reflector 3. For example, the light reception threshold is set in advance for each scanning angle, based on a distance to the reflector 3 and the like.

Conversely, as shown in FIG. 4B, when the intruder 5 is present between the monitoring apparatus 2 and the reflector 3, the laser light is reflected by the intruder 5. Therefore, at time t10, the reflected light is not received (also including a state in which light reception cannot be determined as a result of the light reception amount being too small) or the light is received in a state in which the light reception amount falls significantly below the light reception threshold.

Therefore, whether or not an object is present between the monitoring apparatus 2 and the reflector 3 can be detected through comparison of the actual light reception amount at time t10 and the light reception threshold. That is, the intruder 5 can be detected even should the intruder 5 be farther than the measurement limit position L1.

It can be thought that, when the intruder 5 is between the monitoring apparatus 2 and the reflector 3, the reflected light is received at time t11 corresponding to distance d11 to the intruder 5. However, when the intruder 5 is farther than the measurement limit position L1 of the first detection area R1, the light reception amount falls below the above-described distance measurement threshold. Consequently, the distance cannot be measured. In addition, it is also considered that, because the reflection is not retroreflection, a light reception amount exceeding the light reception threshold is not received.

FIG. 6 is an outlined flowchart showing a monitoring process performed by a control unit 10 provided in the monitoring system.

As shown in this outlined flowchart, at step S1, the control unit 10 orders the laser light source 11 and the rotating mirror 12 to perform the first scan at the first scanning angle A(0). Then, at step S2, the control unit 10 performs the foregoing distance measurement based on the reflected laser light, and at step S3, the control unit 10 determines whether or not the measured distance is smaller than a distance to the measurement limit position L1 (i.e., the measured distance <L1). When this determination is affirmative (i.e., YES), the control unit 10 proceeds with a process at step S4, where the foregoing time-based detection process is performed, so that the first detection unit is functionally actualized through the software processing. In contrast, when the determination at step S3 is negative (i.e., NO), the control unit 10 proceeds with a process at step S5, where the foregoing light reception amount-based detection process is performed, so that the second detection unit is also functionally actualized through the software processing.

After completing the process as step S4 or step S5, the control unit 10 determines at step S6 whether or not the currently-performed scanning angle A(0) is smaller than A(n). If it is determined at step S6 that the currently-performed scanning angle is still smaller than A(n) (YES at step S6), the control unit 10 orders, at step S7, the laser light source 11 and the rotating mirror 12 to perform the next scan at the next scanning angle, and moves its processing to the distance measurement at step S2. In this way, steps S2 to S7 are repeatedly performed for the remaining scanning angles A(2) to A(n). If the determination is NO at step S6 (where the currently-performed scanning angle is A(n)), the control unit 10 ends this process shown in FIG. 6.

As described above, the monitoring apparatus 2 cannot measure the distance to an object for the second detection area R2 that is set farther than the first detection area R1, by the light reception amount-based detecting unit 10b. However, the monitoring apparatus 2 is able to detect whether or not an object is present, that is, able to detect the intruder 5. When the intruder 5 is present between the monitoring apparatus 2 and the reflector 3 and is within the first detection area R1, the intruder 5 can of course be detected by the distance being measured.

According to the embodiment described above, the following effects can be achieved.

The area monitoring system 1 according to the embodiment is configured to include the monitoring apparatus 2 and the reflector 3 (reflector). The monitoring apparatus 2 detects the intruder 5 radiating laser light at each prescribed scanning angle and scanning the area to be monitored R3. The reflector 3 is provided within the area to be monitored R3 and reflects the laser light radiated from the monitoring apparatus 2 towards the monitoring apparatus 2.

In addition, the monitoring apparatus 2 includes the distance-based detecting unit 10a (first detecting unit) and the light reception amount-based detecting unit 10b (second detecting unit). The time-based detecting unit 10a performs detection in the first detection area R1 that is set near the monitoring apparatus 2. The time-based detecting unit 10a detects the intruder 5 at a scanning angle by measuring the distance to an object based on the elapsed time from when the laser light is radiated until the reflected light thereof is received. The light reception amount-based detecting unit 10b performs detection in the second detection area R2 that is set farther than the first detection area R1 and is provided with the reflector 3. The light reception amount-based detecting unit 10b detects the intruder 5 at a scanning angle by comparing the light reception amount at the timing at which the reflected light is received when the radiated laser light is reflected by the reflector 3, and the light reception threshold (reference light reception amount).

As a result, regarding the first detection area R1, the intruder 5 can be detected using a method similar to that in the past, that is, by the time-based detecting unit 10a detecting the distance to the object.

In addition, regarding the second detection area R2, the intruder 5 that is not detectable by the time-based detecting unit 10a can be detected by the light reception amount-based detecting unit 10b determining whether or not an object is present between the monitoring apparatus 2 and the reflector 3, because the reflector 3 retroreflects the laser light. At this time, because the reflector 3 retroreflects the laser light, the reflected light from the reflector 3 can be received at a sufficient light reception amount, even when the distance from the monitoring apparatus 2 is farther than the measurement limit position L1, and even without the output of the laser light being increased.

Therefore, monitoring of the first detection area R1 set near the monitoring apparatus 2 and the second detection area R2 set farther than the first detection area R1 becomes possible. Monitoring over an even greater distance becomes possible, while ensuring safety.

For example, in an example according to the embodiment, when laser light of which the measurement limit position L1 is set to 30 meters is used, the reflected light from the reflector 3 placed 100 meters ahead can be received at a sufficient light reception amount. The detectable range (that is, the position of the detection limit position L2) can be extended to three times that in the past, or more.

In addition, in terms of the actual operation of the monitoring apparatus 2, the laser light is radiated and the reflected light from the reflector 3 is received in a manner similar to that of the time-based detecting unit 10a, even when the light reception amount-based detecting unit 10b detects the intruder 5. Therefore, even when the light reception amount-based detecting unit 10b is provided, the hardware configuration on the monitoring apparatus 2 side is not required to be changed. In addition, the reflector 3 is merely required to reflect the laser light. Therefore, the reflector 3 and the monitoring apparatus 2 are not required to be connected by wiring or the like. The placement operation and the like can be easily performed.

At this time, the first detection area R1 and the second detection area R2 can each be subjected to detection in a single scanning operation. For example, when the amount of time from when the laser light is radiated until the reflected light is received is measured and the timing at which the reflected light is received is determined to indicate reflected light reflected before the measurement limit position L1 of the first detection area R1, detection of the intruder 5 can be performed by the time-based detecting unit 10a measuring the distance.

Meanwhile, when the timing at which the reflected light is received indicates reflected light reflected at a position farther than the measurement limit position L1 of the first detection area R1, whether or not the intruder 5 is present can be detected by the light reception amount-based detecting unit 10b based on the light reception amount and the light reception timing. Therefore, as a result of a simple operation, that is, the reflector 3 being arranged and the light reception amount-based detecting unit 10b being provided by a program update or the like, the present invention can be easily applied even to a system that is already installed.

The width W1 of the reflector 3 in the scanning direction of the laser light is set to be shorter than the width W2 of the intruder 5 presumed as a detection target in the scanning direction. As a result, when the intruder 5 is present, the overall reflector 3 is blocked by the intruder 5, and the light reception amount is thereby reduced with a significant difference. Therefore, whether or not the intruder 5 is present can be reliably detected.

In addition, monitoring of the first detection area R1 set near the monitoring apparatus 2 and the second detection area R2 set farther than the first detection area R1 also becomes possible in a manner similar to that in the above-described area monitoring system 1, by the monitoring apparatus 2 that includes the above-described time-based detecting unit 10a (first detecting unit) and light reception amount-based detecting unit 10b (second detecting unit). An effect can be achieved in that monitoring over an even greater distance becomes possible, while ensuring safety.

According to the present embodiment, an example is given in which a plurality of reflectors 3 are disposed within the area to be monitored R3 by a reflector 3 being provided within the spot area at each scanning angle. However, the reflector 3 is merely required to be placed at required scanning angles. In addition, depending on the distance to the monitoring apparatus 2 and the like, a single reflector 3 that is shared among a plurality of spot areas having overlapping sections may be provided.

Second Embodiment

A second embodiment will be described below with reference to FIGS. 7A and 7B to FIGS. 10A-10C. According to the second embodiment, the arrangement aspect of the reflectors differs from that according to the first embodiment.

Figure 7A:
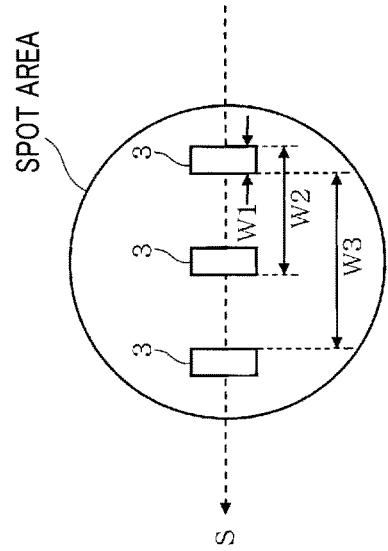
FIG. 7A and FIG. 7B are diagrams schematically showing an aspect of an arrangement of reflectors and light reception amounts when the reflectors are blocked, according to a second embodiment.

According to the present embodiment, as shown in FIG. 7A, a plurality of reflectors 3, serving as the reflectors, are provided within a spot area of the laser light corresponding to a single scanning angle. In addition, the reflectors 3 are provided so as to be separated from each other in the scanning direction, indicated by an arrow S.

At this time, the width W1 in the scanning direction of each reflector 3 is set to be shorter than the width Ws (see FIG. 6A) of the intruder 5, in a manner similar to that according to the first embodiment. In addition, among the reflectors 3, at least a pair of reflectors 3 that are provided adjacent to each other, such as the reflector 3 on the rightmost side in FIG. 6A and the reflector 3 positioned on the left side thereof, are set such that a width (W2; see FIG. 7A) between both ends including the reflection area in the scanning direction is shorter than the width of the intruder 5 in the scanning direction. In a more specific example, the reflectors 3 are arranged such that the width W2 from the right edge of the rightmost reflector 3 to the left edge of the reflector 3 on the left side is shorter than the width Ws of the intruder 5.

In addition, according to the present embodiment, three reflectors 3 are provided in the spot area of the laser light. A width W3 (corresponding to a distance between reflectors) between the two reflectors 3 that are the farthest apart, such as the rightmost reflector 3 and the leftmost reflector 3 in FIG. 7A, is set to be longer than the width Ws of the intruder 5 in the scanning direction. That is, the relationship between the widths W1 to W3 related to the reflectors 3 and the width Ws of the intruder 5 is W1 and W2<Ws<W3. W1<W2 is preferable because the laser light can be reflected over a relatively wide area along the scanning direction, that is, the detection area in the scanning direction can be widened.

Figure 7B:
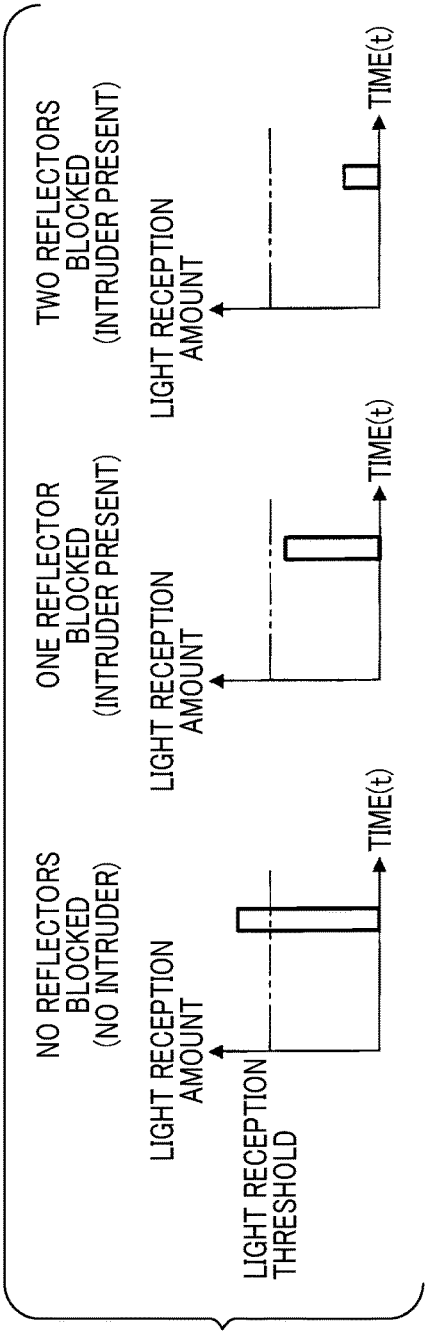

When the reflectors 3 are arranged in this manner, the relationship between the light reception amount received by the monitoring apparatus 2 and the arrangement is such as that shown in FIG. 7B. That is, when the intruder 5 is not present and the reflectors 3 are not blocked, the light reception amount exceeds the light reception threshold. The light reception threshold is similar to that according to the first embodiment. However, the value of the light reception threshold is set with reference to the light reception amount when the intruder 5 is not present and the reflected light is received from the three reflectors 3.

Meanwhile, when one of the reflectors 3 is blocked or when two of the reflectors 3 are blocked, that is, when the intruder 5 is present, the light reception amount attenuates and falls below the light reception threshold. Therefore, the intruder 5 can be detected by the state in which any of the reflectors 3 is blocked. The width W3 between the reflectors 3 farthest from each other is set to be longer than the width Ws of the intruder 5. Therefore, the likelihood of all three reflectors 3 being blocked is low. However, even should all three reflectors 3 be blocked, the light reception amount will still fall below the light reception threshold.

Here, a reason for arranging the reflectors 3 in the manner described above will be described in detail.

Figure 8A:
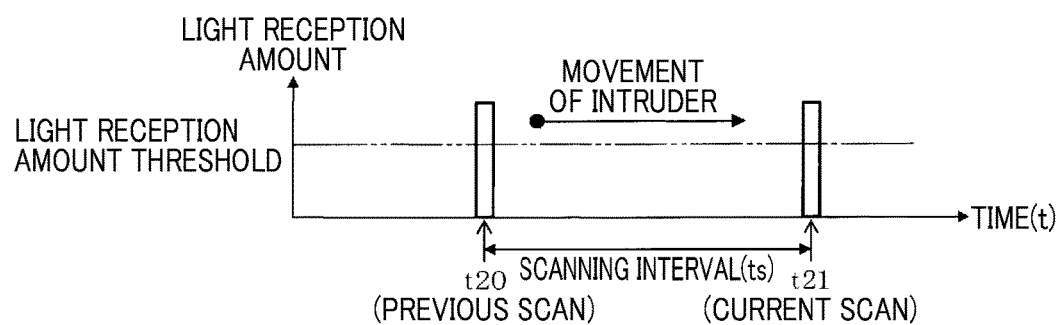
FIG. 8A and FIG. 8B are diagrams schematically showing an example of a situation in which non-detection occurs.

In the area monitoring system 1 in which the area to be monitored R3 is scanned by laser light being radiated at a predetermined scanning angle, as shown in FIG. 8A, when scanning is performed at a certain scanning angle at time t20, the next time that scanning is performed at this same scanning angle is at time t21. That is, a scanning interval (ts) that is a shift in time attributed to the rotation speed of the rotating mirror 12 and the like is present between a previous scan (time t20) and a current scan (t21).

Figure 8B:
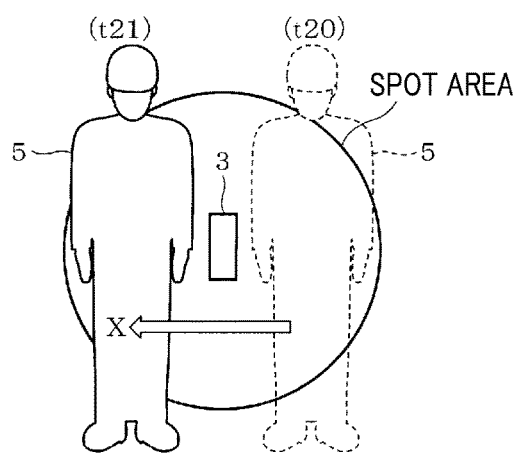

At this time, should the intruder 5 quickly cut in front of the reflector 3 and move during the scanning interval (ts), in the case of an arrangement in which a single reflector 3 is placed or the reflectors 3 are gathered in a single location, as shown in FIG. 8B, the intruder 5 that is present in a position that does not block the reflector 3 at the time of the previous scan (time t20) may cut in front the reflector 3 during the scanning interval (ts) and move once again to a position that does not block the reflector 3 at the time of the current scan (time t21). In this case, the intruder 5 may be not detected because attenuation of the light reception amount is not detected.

The intruder 5 not being detected (notification thereof not being given) regardless of the intruder 5 being present is referred to as non-notification. Taking into consideration the likelihood of the user being given non-notification and the likelihood of the reliability of the system itself being compromised, this issue is considered an important matter in the area monitoring system 1 that should be avoided by all means.

Therefore, according to the present embodiment, the likelihood of non-notification is reduced to the greatest possible extent by the plurality of reflectors 3 being arranged in a state in which the reflectors 3 are separated from each other in the scanning direction as described above.

Figure 9A:
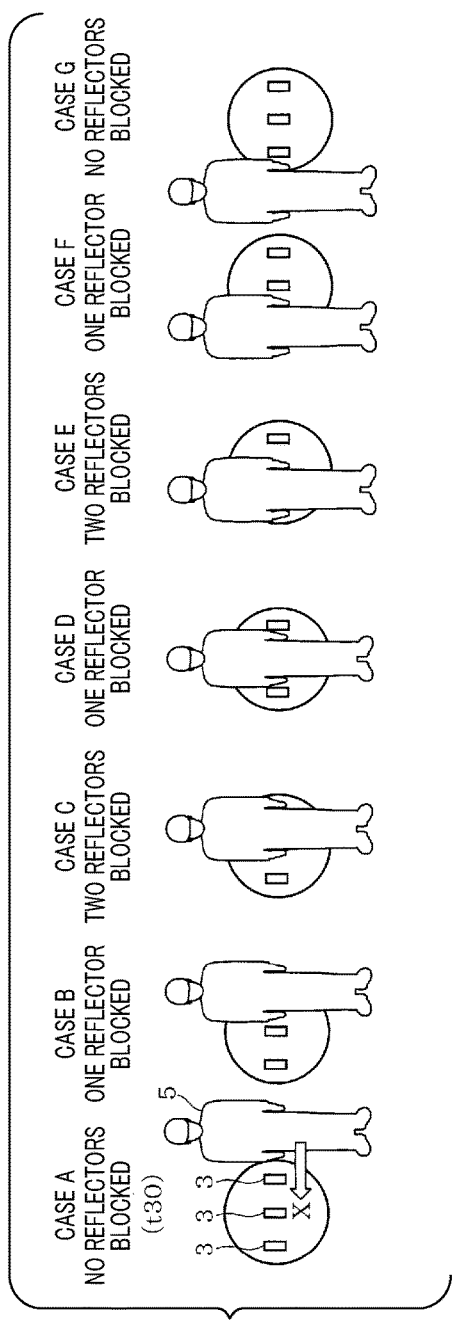
FIG. 9A to 9D are diagrams schematically showing relationships between aspects of reflector-blocking and light reception amount.
Figure 9B:
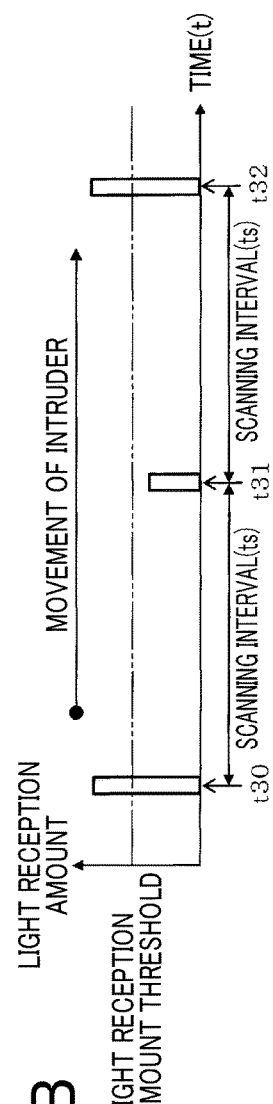

Specifically, for example, the intruder 5 moves along the scanning direction as in cases A to G in FIG. 9A. Hereafter, for convenience, the reflectors 3 are respectively referred to as the right reflector 3, the center reflector 3, and the left reflector 3. In this case, case A indicates a state in which the intruder 5 is not blocking the reflectors 3. Case B indicates a state in which one reflector 3, that is, the right reflector 3 is blocked. Case C indicates a state in which two reflectors, that is, the right and center reflectors 3 are blocked. Case D indicates a state in which one reflector 3, that is, the center reflector 3 is blocked. Case E indicates a state in which two reflectors 3, that is, the center and left reflectors 3 are blocked. Case F indicates a state in which one reflector 3, that is, the left reflector 3 is blocked. Case G indicates a state in which the intrude 5 is not blocking the reflectors 3.

In this case, when the intruder 5 quickly moves from the position in case A to the position in case G, the period over which the reflectors 3 are blocked, as in cases B to F, is long. Therefore, for example, even should the intruder 5 present in the position in case A at time t30 move, the state in which the light reception amount has attenuated can be detected if the reflector 3 is blocked at time t31. That is, the period required for the intruder 5 to cross all of the reflectors 3 becomes longer than the period required when only a single reflector 3 is provided. Therefore, the period over which the intruder 5 is blocking any of the reflectors 3 is long. A sufficient detection period is ensured, and the likelihood of the intruder 5 being detected increases.

In addition, as a result of the plurality of reflectors 3 being provided, it becomes relatively difficult for the intruder 5 to move without blocking any of the reflectors 3. The movement of the intruder 5 can be impeded, such as by preventing the intruder 5 from moving quickly. As a result, further increase in the likelihood of detection can be expected.

For example, in cases in which the intruder 5 sprints through or the like, the intruder 5 not being detected at one scanning angle can be considered as a possibility. However, when the area monitoring system 1 is considered as a whole, it is thought that detection of the intruder 5 is sufficiently possible, as described below.

Figure 9C:
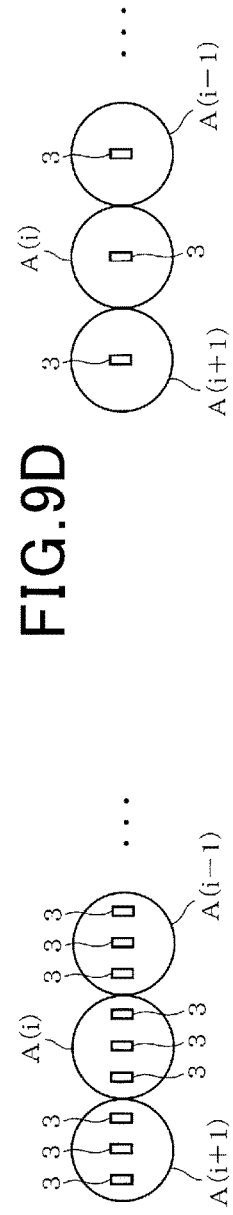
Figure 9D:
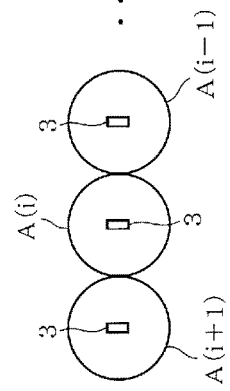

That is, in the area monitoring system 1, as shown in FIG. 9C and FIG. 9D, the spot area is set to be adjacent to or partially overlapping, in the scanning direction, the spot areas of the preceding scanning angle and the subsequent scanning angle such that an undetected area is not formed. Alternatively, the spot areas are placed close together such that the undetected area is smaller than the width of the intruder 5 (such as a person). Therefore, even when the possibility of the intruder 5 not being detected at one scanning angle can be considered, it is thought that the intruder 5 can be detected at the preceding or subsequent scanning angle.

In addition, as described above, the reflector 3 is placed at a distance far from the monitoring apparatus 2, such as 100 meters. Therefore, in realistic terms, it can be considered extremely difficult for the intruder 5 to grasp the positional relationship between the reflector 3 and the monitoring apparatus 2 located 100 meters away, and take a position so as not to overlap with the reflection direction or move so as to avoid the scanning timing of the monitoring apparatus 2. Furthermore, taking into consideration that the intruder 5 is likely to intrude at night, it is thought that such movement is even more difficult.

Therefore, as a result of the reflectors 3 being arranged within the spot areas as according to the present embodiment and the above-described first embodiment, from the perspective of the area monitoring system 1 as a whole, a sufficient monitoring function can be provided. As a result of the plurality of reflectors 3 being arranged such as to be separated from each other in the scanning direction as according to the present embodiment, the likelihood of non-notification at each scanning angle can be further reduced.

According to the embodiment described above, the following effects can be achieved.

Because the reflectors 3 are arranged, an effect can be achieved in that monitoring over an even greater distance becomes possible, while ensuring safety, in a manner similar to that according to the above-described first embodiment.

In addition, according to the present embodiment, a plurality of reflectors 3 are provided within the spot area of the laser light so as to be separated from each other in the scanning direction of the laser light. As a result, the period over which the intruder 5 blocks the reflectors 3 when the intruder 5 moves can be increased. The likelihood of the intruder 5 being detected can be increased.

Furthermore, at least the pair of reflectors 3, among the plurality of reflectors 3, that are provided adjacent to each other are set such that the width (W2; see FIG. 7A) of the reflection area is shorter than the width Ws of the intruder 5 in the scanning direction. Therefore, when the intruder 5 is present, sufficient attenuation in the light reception amount can be observed. Whether or not the intruder 5 is present can be more reliably determined.

In addition, three or more reflectors 3 are provided in the spot area. The distance (W3: refer to FIG. 7A) between the two reflectors 3, among these reflectors 3, that are the farthest from each other is set to be longer than the width Ws of the intruder 5 to be detected in the scanning direction. As a result, any of the reflectors 3 will be blocked by a slight movement. In addition, the movement distance required to avoid blocking of all of the reflectors 3 is long. Therefore, the likelihood of the intruder 5 being detected can be increased.

According to the present embodiment, an example is given in which a plurality of reflectors 3 are provided in the spot area at each scanning angle. However, the reflector 3 is merely required to be placed at required scanning angles. In addition, depending on the distance to the monitoring apparatus 2 and the like, a single reflector 3 that is shared among a plurality of spot areas that have overlapping sections may be provided.

Other Embodiments

The present invention is not limited to the aspects described above and shown in the drawings. Various modifications and expansions are possible without departing from the spirit of the invention.

The distances, numbers, and the like given in each embodiment are examples. The present invention is not limited thereto.

The reflector 3 is not necessarily required to be provided for all scanning angles. The reflectors 3 may be arranged as appropriate based on the value of the scanning angle and the size of the presumed intruder 5.

The reflector 3 that performs retroreflection is given as an example of the reflector according to the embodiments. However, a member having high reflectance, such as a mirror, may be arranged so as to directly face the monitoring apparatus 2.

According to the embodiments, an example in which the angular range over which the monitoring apparatus 2 is capable of monitoring is substantially 180 degrees is given. However, the angular range may be set as appropriate.

Figure 10A:
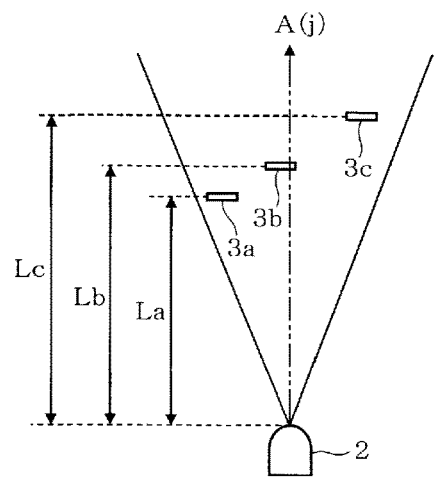
FIG. 10A to FIG. 10C are diagrams schematically showing other aspects of the arrangement of reflectors.

According to the second embodiment, an example is given in which the reflectors 3 are arranged on the same plane within the spot area. However, as shown in FIG. 10A, the distance between each reflector 3 and the monitoring apparatus 2 may differ. In the case shown in FIG. 10A, a reflector 3a is arranged in a position at a distance La from the monitoring apparatus 2. A reflector 3b is arranged in a position at a distance Lb from the monitoring apparatus 2. A reflector 3c is arranged in a position at a distance Lc from the monitoring apparatus 2.

Figure 10B:
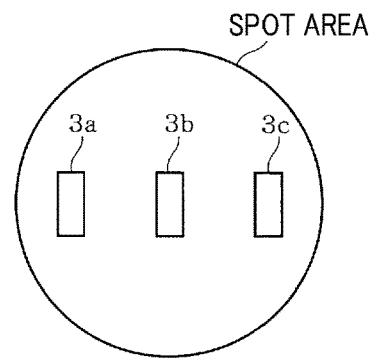

In such cases as well, as shown in FIG. 10B, when viewed from the monitoring apparatus 2 side, that is, in a state in which the reflectors 3a to 3c are projected on a plane perpendicular to the scanning angle, the reflectors 3a to 3c are arranged so as to be separated from each other in the scanning direction. In a manner similar to that according to the second embodiment, the period over which the reflectors 3 are blocked when the intruder 5 moves can be increased. An effect can be achieved in that the likelihood of detection of the intruder 5 can be increased.

Figure 10C:
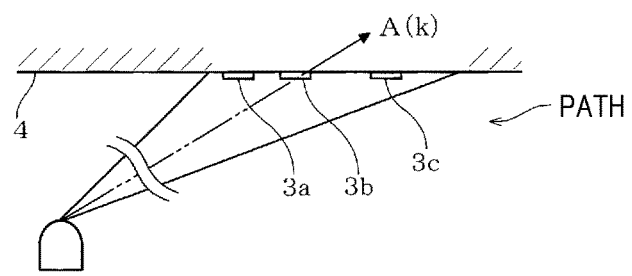

In addition, because the distances between the monitoring apparatus 2 and the reflectors 3 can differ in this way, for example, as shown in FIG. 10C, when the background object 4 such as a building is present in the area to be monitored R3 and a path in front of the background object 4 is to be monitored, the reflectors 3a to 3c that perform retroreflection are merely required to be provided on the background object 4. Therefore, installation is easily and the user is not made to feel inconvenienced, because the path is not blocked.

EXPLANATION OF REFERENCE NUMBERS

In the drawings, 1 denotes an area monitoring system, 2 denotes a monitoring apparatus, 3 denotes a reflector (reflector), 5 denotes an intruder, 10 denotes a time-based detecting unit (first detecting unit), 10b denotes a light reception amount-based detecting unit (second detecting unit), 13 denotes a light receiving unit, R1 denotes a first detection area, R2 denotes a second detection area, and R3 denotes an area to be monitored.

What is claimed is:

1. A system for monitoring an area to be monitored, the system comprising:

a monitoring apparatus that detects an object by radiating laser light at each of predetermined scanning angles and scanning the area to be monitored; and a reflector that is provided in the area to be monitored and configured to reflect the laser light radiated from the monitoring apparatus towards the monitoring apparatus, wherein the monitoring apparatus includes a radiating unit that radiates the laser light;

a light receiving unit that receives reflected light when the laser light radiated from the radiating unit is reflected by the object;

a first detecting unit that detects the object at each of the scanning angles by measuring a distance to the object based on an elapsed time from when the laser light is radiated until the reflected light is received, for a first detection area set nearer to the monitoring apparatus than a second detection area is; and a second detecting unit that detects, in the second detection area, the object at each of the scanning angles by comparing a light reception amount at a timing at which reflected light is received when the radiated laser light is reflected by the reflector, and a reference light reception amount set in advance to determine whether or not the object is present between the monitoring apparatus and the reflector, the second detection area being set farther than the first detection area is and being provided with the reflector as an area subjected to detection.

2. The system of claim 1, wherein the reflector is provided within a spot area, the spot area being an area over which the laser light is irradiated at each of the scanning angles, a width of the reflector in a scanning direction of the laser light being set to be shorter than a width of the object presumed to be a detection target in the scanning direction.

3. The system of claim 1, wherein the reflector is composed of a plurality of reflectors provided within a spot area, the spot area being an area over which the laser light is irradiated at each of the scanning angles, the reflectors being provided so as to be separated from each other in the scanning direction of the laser light.

4. The system of claim 3, wherein the plurality of reflectors include at least one pair of reflectors which are provided adjacently to each other, the at least one pair of reflectors being set such that a width between both ends of the reflectors in the scanning direction including a reflection area of the reflectors is shorter than the width of the intruding object in the scanning direction.

5. The system of claim 2, wherein the reflector is composed of a plurality of reflectors provided within a spot area, the spot area being an area over which the laser light is irradiated at each of the scanning angles, the reflectors being provided so as to be separated from each other in the scanning direction of the laser light.

6. The system of claim 5, wherein the plurality of reflectors include at least one pair of reflectors which are provided adjacently to each other, the at least one pair of reflectors being set such that a width between both ends of the reflectors in the scanning direction including a reflection area of the reflectors is shorter than the width of the intruding object in the scanning direction.

7. An apparatus for monitoring an area to be monitored, the apparatus comprising:

a radiating unit that radiates laser light at each of predetermined scanning angles such that the laser light scans an area to be monitored;

a light receiving unit that receives reflected light when the laser light radiated from the radiating unit is reflected by an object;

a first detecting unit that detects the object at each of the scanning angles by measuring a distance to the object based on an elapsed time from when the laser light is radiated until the reflected light is received, for a first detection area set nearer to the monitoring apparatus than a second detection area is; and a second detecting unit that detects, in the second detection area, the object at each of the scanning angles by comparing a light reception amount at a timing at which reflected light is received when the radiated laser light is reflected by a reflector, and a reference light reception amount set in advance to determine whether or not an object is present between the monitoring apparatus and the reflector, the second detection area being set farther than the first detection area is and being provided with the reflector as an area subjected to detection.

* * * * *